Nov. 21, 1961    J. H. COHEN    3,009,514
CONCENTRATION PROCESS FOR AQUEOUS GELATIN SOLUTIONS
Filed Dec. 30, 1957
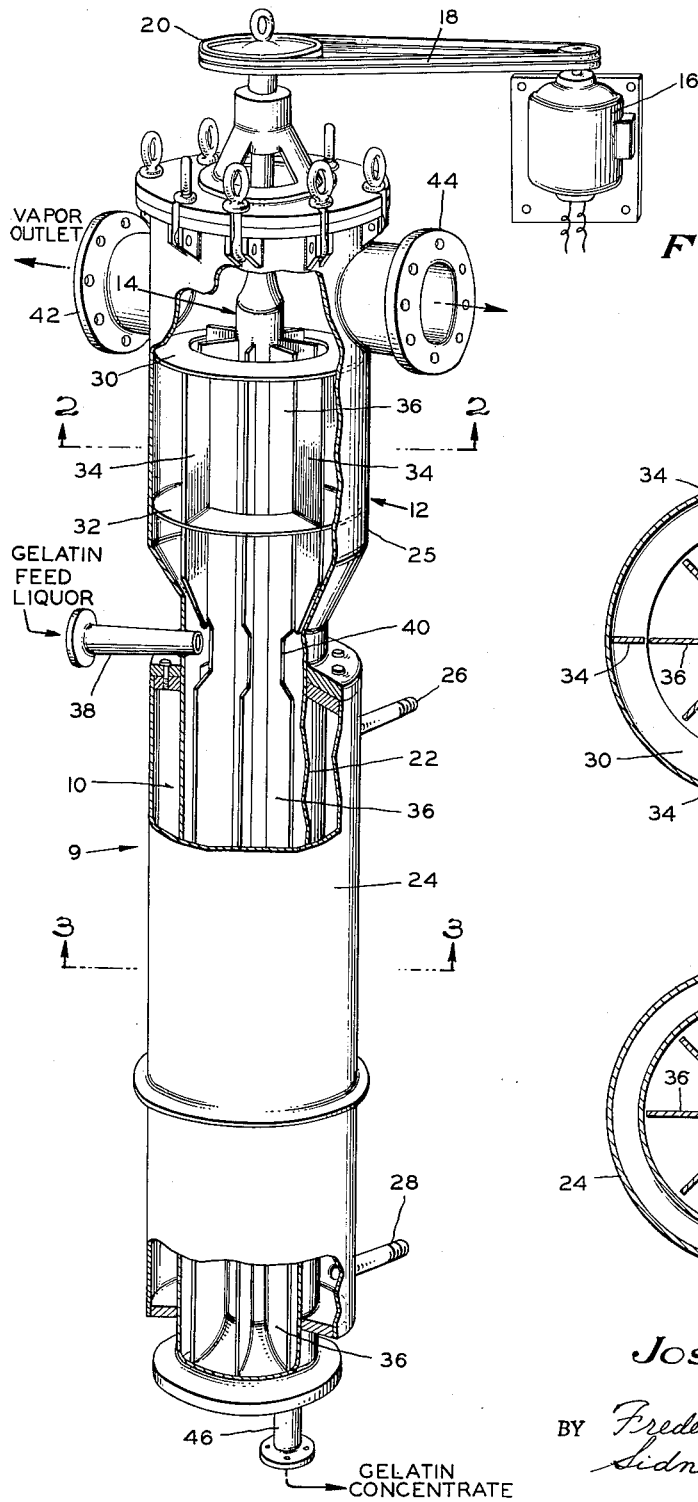
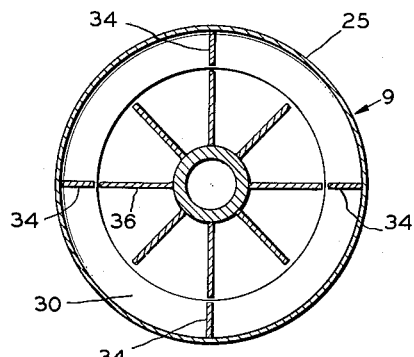
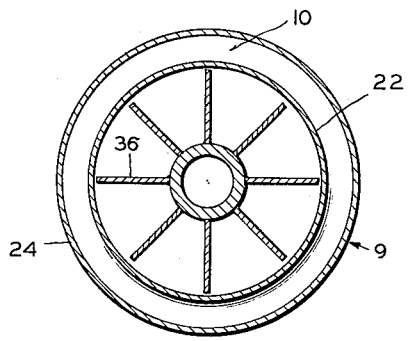
INVENTOR
Joseph H. Cohen
BY Frederick F. Mack
Sidney M. Honey
ATTORNEYS

United States Patent Office 3,009,514
Patented Nov. 21, 1961

3,009,514
CONCENTRATION PROCESS FOR AQUEOUS
GELATIN SOLUTIONS
Joseph H. Cohen, Brookline, Mass., assignor to General Foods Corporation, White Plains, N.Y., a corporation of Delaware
Filed Dec. 30, 1957, Ser. No. 706,535
2 Claims. (Cl. 159—49)

This invention relates to a process for concentrating gelatin solutions and more particularly to the production of gelatin solutions of high concentration.

As is well known to those skilled-in-the-art, gelatin is recovered from various raw materials by prolonged contact with aqueous extraction liquors. Although it is of course desired to obtain as concentrated a solution of gelatin as is possible, various practical considerations preclude the attainment of solutions containing more than about 2%–7% gelatin concentration. Commonly the effluent from the extraction operation is of the order of 2.5% to 4.5%.

In view of the fact that commercial practice dictates that gelatin be handled in dry form containing about 10% moisture, it is necessary to concentrate the effluent from the extraction operation. This has customarily been done by evaporation of the liquor in tubular evaporators to as high a concentration as possible. Although this may be as high as about 24%–30%, it customarily falls in the range of up to about 16%. If the evaporation is carried much above this point, the heat transfer rate decreases to such an extent that the evaporator capacity becomes undesirably low and physical porperties are seriously affected. The higher temperatures required to effect evaporation under these conditions preclude most efficient operation of the process and are highly conducive to deterioration of the gelatin with respect to grade and bloom. The combination of these factors thus prevents evaporation to concentrations higher than the noted range.

Accordingly it has been common to take the effluent from the triple effect evaporators in which it is customarily concentrated, at a typical concentration of about 16% and to gel it before further drying. Typically, this means pouring the gelatin liquor onto chilled belts and cooling the same to permit it to gel. The gelled gelatin may then be dried from about 16% gelatin by use of a tunnel-drier or a tray-drier to give the desired final product having a gelatin concentration of e.g. 90% gelatin or, as more commonly expressed, a gelatin containing about 10% water.

The large quantities of air which must be heated and passed over the gelatin; the large size of the apparatus required to effect this operation; the handling operations of the gelatin in its various stages of drying; and the losses inherent in the particular mechanical operations all contribute to the expense and undesirability of tunnel drying or tray drying.

Attempts have heretofore been made to eliminate or at least minimize the undersirable features and expense of tunnel drying or tray drying. It is apparent that if it were possible to raise the concentration of the gelatin liquor leaving the evaporation step, then to this extent at least the expense of the subsequent tray or tunnel drying would be decreased. Although these desiderata have long been known, it has not heretofore been possible to achieve them, as is well known to those skilled-in-the-art.

It is an object of this invention to provide a process for concentrating gelatin solutions. It is another object of this invention to provide a process for obtaining high concentrations of gelatin without loss of bloom. Other objects will be apparent to those skilled-in-the-art on inspection of the following description.

According to certain aspects of this invention, gelatin solution may be concentrated by forming the solution into a thin film in a heating zone, passing the thin film continuously downwardly throughout its passage through said heating zone, maintaining a vacuum over the surface of the downwardly descending film, heating the film during its passage through the heating zone whereby a vapor is liberated therefrom at least partially in the form of steam which passes into a section of the heating zone immediately adjacent to the thin film, impinging the film and vapor whereby liquid contained in the vapor is separated therefrom, returning the separated liquid to the thin film, withdrawing a continuous liquid film of concentrated gelatin solution from the bottom of said heating zone, and withdrawing vapor from the upper portion of said heating zone.

Although gelatin solutions of any dilution can be concentrated in accordance with this invention, the particular advantages obtained by use of the invention are obtained when the charge gelatin solution is in the range of 15%–35%. More commonly however the charge solution will be in the range of about 18%–28%. This solution may have been obtained by concentrating the diluted extraction liquor in a triple effect evaporator.

The temperature of the gelatin solution as it is passed into the heating-evaporation operation may for example be preheated to about 140° F.–150° F. Under preferred operating conditions, the feed liquor will be at a temperature at or just below its equilibrium-boiling point temperature under the conditions prevailing in the heating zone as hereinafter set forth in detail.

Gelatin charge liquor is admitted at the temperature and concentration noted into a heating zone in the form of a thin film which, under the influence of gravity, falls downwardly through the zone. Preferably the film may be formed, at least in part, by passage of a controlled quantity of liquor over a heat transfer surface. The vacuum within the heat transfer zone may be as low as 13–15 inches of mercury, but preferably it will be about 24–26 inches of mercury below atmosphere, i.e. about 100–150 mm. Hg absolute pressure.

During its passage through the heating zone, the gelatin solution is subjected to evaporation as it contacts the heating surface. Typically that surface will be heated by steam at e.g. 212° F.–260° F., preferably at about 245° F. Steam pressures to effect these temperatures are 0–21 p.s.i.g., say 13 p.s.i.g.

As the descending solution is evaporated, steam is liberated therefrom together with a quantity of entrained feed liquor. The vapor containing these two components passes into a section of the heating zone immediately adjacent to the thin film of downwardly descending liquor. The film and the vapor are subjected to impingement to separate the entrained liquid therefrom and that separated entrained liquid is returned to the downwardly descending thin film. By impingement is meant contacting with a preferably moving surface whereby the liquid in the vapor is separated therefrom.

The liquor is subjected to evaporation until its concentration is raised to as high as 35%–60%. It is a particular feature of this invention that concentrations as high as 50%–60% may be readily obtained without any difficulty of operation or without any degradation of the gelatin. This aspect of the invention is one which has long been desired; but as is well known to those skilled-in-the-art, it has heretofore been impossible to continuously evaporate gelatin solutions to this extent in commercial practice without substantial degradation.

It is a particular feature of this invention that the time of residence of the gelatin in the heating zone be as short as possible. Typically it will be not more than about 10 seconds from the time of admission to the time of withdrawal. It is found that the bloom and viscosity of the gelatin are substantially unchanged during the course of concentration—typically the loss of bloom is less than about 3%–4% and the loss in viscosity is less than about 1%–2%.

Although it may be possible to carry out the process of this invention in various types of apparatus, a preferred embodiment is illustrated in the accompanying drawing wherein FIG. 1 is a perspective view partly in section of an evaporating apparatus within which the process of the instant invention may be carried out; FIG. 2 is a sectional view along line 2—2 of FIG. 1; FIG. 3 is a sectional view along line 3—3 of FIG. 1.

In the drawing, a cylindrical evaporator section 9 is formed by cylindrical wall 22 enclosed in and concentric with steam jacket 10 formed by cylindrical wall 24 and aligned with cylindrical vapor condenser section 12 formed by wall 25. A rotor 14, driven by motor 16 through belt 18 and pulley 20, extends longitudinally through evaporator section 9 and the condenser section 12.

Steam is passed through steam jacket 10 by inlet and outlet pipes 26 and 28, respectively. The condenser section 12 contains a pair of annular baffle plates 30 and 32 interconnected by a plurality of longitudinally extending baffles 34. The rotor 14 bears a plurality of radially extending vanes 36 extending longitudinally within the evaporator section 10 and the condenser section 12. The outermost edges of the vanes 36 lie within the surface of the inner cylindrical wall 22 and as close to said surface as is feasible with the rapid rotation of said vanes.

The evaporator section 9 is equipped with gelatin liquor feed pipe 38 and gelatin concentrate outlet pipe 46 at the top and bottom, respectively, of said section. The vapor condenser section 12 is equipped with vapor outlets 42 and 44 to which may be attached suitable evacuating means (not shown), such as a vacuum pump.

In carrying out the process of the present invention according to one embodiment thereof, the rotor 14 is started, its rate of revolution being of the order of 325 r.p.m.; the vacuum pump or other evacuating means is started; the relatively dilute feed or charge gelatin solution or liquor is introduced through pipe 38 into the evaporator section 9 at the point 40 at which the rotor vanes 36 are cut away to permit said entry; and the evaporator section 9 is brought up to temperature by introducing steam into steam jacket 10 from steam inlet 26. The rapid rotation of the rotor vanes 36 distributes the gelatin solution as a film about the wall 22 and also provides vigorous agitation of the film to provide maximum heat transfer. The linear speed of the outer edge of rotor vanes 36 near wall 22 is of the order of 2500 ft./min. In this manner the concentration of the gelatin solution is effected as quickly as possible and the temperature employed for such concentration is reduced to a minimum. As a result, the loss of bloom and viscosity of the gelatin is minimized.

Any gelatin-containing liquor entrained in the vapor is separated by impingement on the baffle plates 30 and 32, the vertical baffles 34, and on the rotor vanes 36 which are rapidly rotating. The gelatin concentrate provided as the turbulent thin film descends within the evaporator section 9 and is collected at the bottom of said section where it is removed through outlet port 46.

The temperature of the steam employed in steam jacket 10 might for example be of the order of 212° F.–240° F. if the concentration of the gelatin feed liquor were about 18%–28% and it were desired to concentrate this solution to 35%–60% concentration. A vacuum of about 24–26 inches prevailing in the evaporator section 9 results in a vapor temperature of about 125° F.–145° F., the temperature of the effluent gelatin concentrate being about 120° F.–140° F.

It is a feature of this invention that evaporation of gelatin solutions to high concentrations, e.g. 50%–60%, occurs under conditions such that the holdup time of the gelatin within the evaporator section is less than about 10 seconds. This substantially reduced processing period is attributable to the relatively thin film and the high degree of turbulence therein produced by the rotor vanes 36 as a result of their having a very slight clearance with the inner surface of cylindrical wall 22, the evaporating surface. Under these conditions the loss of bloom or viscosity during processing is substantially negligible.

As the temperature in the steam jacket 10 is increased up to about 240° F., the rate of heat transfer through the cylindrical wall 22 is correspondingly increased with proportionately higher rates of evaporation, and, other factors remaining constant, the degree of concentration effected on a single pass is increased. The vacuum employed should not reduce the temperature of the gelatin to a point where the viscosity of the gelatin is excessive. Improper vacuum would reduce the evaporation rate, overload the rotor, and foul the evaporator surface, i.e., wall 22. Increasing the speed of the rotor 14 beyond that required for proper distribution and agitation of the gelatin film is advantageous in reducing the development of foam and the entrainment of gelatin in water vapor. Likewise, as the rate at which the gelatin liquor is fed through inlet pipe 38 is decreased, other factors remaining constant, the holdup time within the evaporator section 9 is increased and the degree of concentration effected per pass of gelatin solution is also increased.

However, while high steam temperatures, increased vacuum and reduced rate of gelatin feed may increase the degree of concentration of the gelatin solution, too high a concentration is to be avoided by reason of possible degradation of the gelatin at the high temperatures required resulting in excessive lowering of bloom and viscosity. The process accordingly will be varied as to temperature, vacuum and heat rate conditions in accordance with the percent of gelatin concentration consistant with the maintenance of suitable levels of bloom and viscosity.

The process of the present invention is illustrated by reference to the following examples wherein viscosity is expressed as millipoises when measured in a 6% gelatin (dry basis) solution at 60° C. and bloom determinations are expressed numerically in accordance with test procedures outlined in "Industrial and Engineering Chemistry," analytical editions, vol. II, p. 348 and vol. XVIII, p. 64.

*Example I*

A 34.5% aqueous solution of low bloom gelatin, viz., 104–105 bloom, viscosity 30–33 M.P., was fed at a rate of 280 lbs./hr. to the evaporator operating at a vacuum of 15 inches mercury and having a jacket steam temperature in the order of 245° F. obtained by use of steam at 13 p.s.i.g. Gelatin feed temperature was 140° F.–150° F. The concentrated gelatin solution from the evaporator had a gelatin concentration of 58.8%. Loss in viscosity was 0%.

*Example II*

In this example, the solution of Example I was admitted to the evaporator at a rate of 425 lbs./hr., other conditions being maintained as before. Concentration of the effluent was about 53%. The concentrated gelatin had a bloom loss in the order of 3%–4% with virtually no reduction in viscosity.

*Example III*

A 29.4% solution of high bloom gelatin having a bloom in the order of 265 and viscosity in the order of 48 M.P. was concentrated in the evaporator using the steam temperature of 254° F. and a gelatin feed temperature of 144° F. under a vacuum of 13 inches of mercury. At a feed rate of 285–300 lbs./hr. there was an increase in percent concentration in the order of 25%–30% to a final gelatin solution concentration of the order of 56%–60%. The final product had a loss in bloom of only 1%–2% and a viscosity decrease of the order of 2%–3%. The gelatin concentrate had a desirable light color and produced a gelatin jelly substantially free of haze.

It will be noted from the foregoing examples that the process of the present invention is characterized by a high rate of evaporation without substantial decrease in bloom or viscosity and almost any degree of concention of gelatin solution can be effected by controlling the temperature of the heat exchange unit as well as the feed rate, the vacuum, and the gelatin feed temperature. Both high and low bloom pig, calf, and bone gelatin solutions can be processed according to this invention.

While the present invention has been described in connection with particular embodiments and specific examples have been used to illustrate the same, it is not to be construed as limited thereby but rather reference should be had to the appended claims for a definition of the limits of the invention.

This application is a continuation-in-part of application Serial No. 484,610, filed January 28, 1955, and entitled "Process," and now abandoned.

What is claimed is:

1. Process for concentrating an aqueous 15%–35% solution of gelatin under conditions such that the physical properties of the gelatin remain substantially unaltered which comprises feeding said solution preheated to a temperature of about 140° F.–150° F. into a heating zone in the form of a thin film, passing the thin film continuously downwardly throughout its passage through said heating zone, impressing a vacuum of 13–26 inches of mercury below atmosphere over the surface of the downwardly descending film, heating the film in said heating zone to maintain it at a temperature of about 120° F.–140° F. during its passage through the evacuated heating zone to liberate therefrom a vapor having entrained a quantity of gelatin solution impinging said vapor against a surface to separate said entrained solution from said vapor, returning the separated solution to the thin film, withdrawing a continuous liquid film of concentrated 30%–60% gelatin solution from the bottom of said heating zone, and withdrawing vapor from the upper portion of said heating zone.

2. A process for concentrating an aqueous 18%–28% solution of gelatin under conditions such that the physical properties of the gelatin remain substantially unaltered which comprises feeding said solution preheated to a temperature of about 140° F.–150° F. into a heating zone in the form of a thin film, passing the thin film continuously downwardly throughout its passage through said heating zone, impressing a vacuum of 24–26 inches of mercury below atmosphere over the surface of the downwardly descending film, heating the film in said heating zone to maintain it at a temperature of about 120° F.–140° F. during its passage through the evacuated heating zone to liberate therefrom vapor having entrained a quantity of gelatin solution, impinging said vapor against a surface to separate said entrained solution from said vapor, returning the separated solution to the thin film, withdrawing a continuous liquid film of concentrated 30%–60% gelatin solution from the bottom of said heating zone, and withdrawing vapor from the upper portion of said heating zone.

References Cited in the file of this patent

UNITED STATES PATENTS

| | | |
|---|---|---|
| 1,844,643 | D'Yarmett | Feb. 9, 1932 |
| 2,542,270 | Zahm | Feb. 20, 1951 |
| 2,546,380 | Zahm | Mar. 27, 1951 |
| 2,581,081 | De Vout | Jan. 1, 1952 |
| 2,596,086 | Muller | May 6, 1952 |
| 2,811,200 | Montgomery | Oct. 29, 1957 |
| 2,812,019 | Rasmussen | Nov. 5, 1957 |
| 2,857,962 | Rogers | Oct. 28, 1958 |

FOREIGN PATENTS

| | | |
|---|---|---|
| 321,410 | Great Britain | Nov. 1, 1929 |